UNITED STATES PATENT OFFICE.

ROBERT ATHELSTAN MARR, OF BLACKSBURG, VIRGINIA.

PROCESS OF PRESERVING CUT TIMBER AND PRODUCT THEREOF.

1,023,745.   Specification of Letters Patent.   Patented Apr. 16, 1912.

No Drawing.   Application filed February 4, 1910. Serial No. 541,964.

*To all whom it may concern:*

Be it known that I, ROBERT A. MARR, citizen of the United States, residing at Blacksburg, Montgomery county, State of Virginia, have invented certain new and useful Improvements in Processes of Preserving Cut Timber and the Product Thereof, of which the following is a full, clear, and exact description.

My invention relates to the preservation of cut timber generally, for structural and other uses in the arts and trades.

It is applicable to green timber as to seasoned timber, and to both coniferous and broad-leaved varieties.

It has for its object the treatment of such timbers, not only to preserve them from natural decay due to moisture and moist-heat, but against decay due to the known effect of bacteria and fungi, the spores of which enter the pores and ducts of the timber and destroy the wood tissues.

A further object of the invention, is the preservation of the timber against the destructive effect of boring insects, distinctive from bacteria and fungi, which as well known, enter the timber through self-bored radial passages, and effect its destruction, more or less complete, by a boring and a biting action on its constituent tubes and cells and its combining and binding structural tissues. And a final object of the invention, which results from the treatment hereinafter described, is the production of preserved timber which has increased strength and resiliency and improved insulation, which is impermeable as well to exterior moisture as to the destructive living organisms hereinabove referred to.

To these ends my invention comprises as well the method or process hereinafter described, as the product of such process in either or both of its identifying steps.

The timber to be acted upon is any kind or variety of cut timber, preferably with the bark removed, and it may be either in a green state or in a seasoned condition; though the time occupied in the preservation of any given specimen, varying somewhat for that reason, will depend upon its diameter and its length, as also upon its variety; oak and chestnut timber, for example, being more slowly responsive to the treatment than woods of the coniferous variety. By the words "raw cut timber in its normal condition" as used in the claims I mean raw cut timber whether with or without the removal of the bark.

The basic principle of the process consists in isolating and encysting the pores, cells, tracheids and ducts of the timber, destroying any bacterial spores therein, and in closing such pores, cells and ducts to any further subsistence of destructive spores, in and by a substance insoluble in water and organic acids, specifically a hydrocarbon of the paraffin series of petroleum distillate, as an example of which I have found the solid cakes of commercial paraffin, melted in a suitable open container, to be adequate for the purpose. But in order to properly prepare the timber for such treatment and to cause the paraffin to properly and thoroughly enter the natural openings, pores, ducts and cells thereof, I have found that immediately before exhibiting the timber to the action of the paraffin, it should be subjected to the action of a volatile oil of the gasolene series of the petroleum products; specifically benzin of commerce.

The function of the volatile oil of the gasolene series, relatively to the cut timber is to drive out the air and moisture in the cells, pores and ducts of the timber and create a capillary action of the melted paraffin, which latter on cooling isolates into groups and encysts the cell structures in the interior of the timber as well as filling numbers of the pores and ducts and also forms an exterior thin covering. In other words the volatile oil of the gasolene series, operates in a sense as a carrier of the paraffin, having previously put the cellular tissues of the timber into suitable condition to receive it and enable it to effectively perform its described function on such cellular tissues. As previously stated the timber so treated becomes impermeable by living organisms, such as fungi and other bacterial spores, but in order to make it impermeable by boring and biting insects, I have found that end to be readily accomplished by adding to the bath of benzin and the bath of melted paraffin, or ether, but preferably to both, a small proportion of silica in exceedingly fine comminuted form.

I will now describe in detail a practical application of my invention, as illustrative examples of its principle. The log of cut timber, preferably with its bark removed, is immersed without any other previous preparation and at atmospheric temperature, in an open tank, in which is placed a quantity of benzin of commerce, sufficient to fully immerse the log, and in which it is permitted to remain for a period varying from 20 to 60 minutes, the variation being governed by the diameter of the log and the variety of the timber. The effect is to open up the cellular tissues, by a process of absorption, which tests show to be almost if not wholly complete, extending to the center of the log, but without effecting any appreciable change in the cellular tissues or their natural contents, except perhaps to soften and expand them, but certainly not to harden nor contract them. As the material of this bath is volatile, and this first step in the process is employed to prepare the log for treatment in the second step, it should be further acted on therein with reasonable promptness, and to that end the log is removed from the first tank to the second, while the volatilization of the absorbed gasolene is going on. The second tank is one which is adapted to be heated, either by externally applied means or by hot coils within it, and in this tank is made up a bath of liquid paraffin, which may be prepared from commercial solid cakes of paraffin, melted in the tank, by the heat applied as aforesaid, care being taken not to raise the temperature above 212° F., and preferably not much over 180° F., and to keep it within that range; as a cooking, in any sense, of the wood is not desired and is to be avoided. In this bath the log is to remain immersed for a period of from one to four hours, depending upon the diameter of the log and the variety of the timber; for example, I found that for a red oak log of 1 foot in length and of a mean diameter of 8 inches, an exposure of four hours was desirable and productive of the result sought, after removal from the tank and cooling, which is to deposit a very thin film of paraffin, insoluble in water and organic acids, within the pores and ducts and upon the exterior skin of the timber, making it impermeable to the entrance, formation or growth of bacterial spores, as well as substantially waterproof. If it be desired to harden the paraffin films so deposited, an addition to the paraffin bath of 2 to 4 per cent., by weight, of stearic acid, will be effectual for the purpose.

In the operation of this process it is productive of the best results to allow a slow cooling, in the bath, until the temperature of the latter is materially reduced, rather than removing it from the bath at a high temperature to cool in the external atmosphere.

A further feature of the invention, which, however, is not a matter of absolute essentiality, but which for some woods is exceedingly desirable, is a mixture with the gasolene in the first step, and also with the paraffin in the second step, or in the latter alone, of a small portion of diatomaceous earth, commonly found in natural condition, the principal component of which is silica, and which has as low a specific gravity as 0.33. The silicious tests, commonly so called, need to be exceedingly fine, more so in that respect than silica quartz has ever been produced, so far as I am aware, by any mechanical process, and this element depends for its efficiency in my process on its finely comminuted condition, microscopic tests which I have made showing a plurality sometimes as much as 17 or 18 tests of silica in a cross section of a timber pore of the red oak wood. The proportion in which such diatomaceous earth is used is about 2 ounces by weight to one gallon of the gasolene and the same of the liquid paraffin. I find that the gasolene will, to a very considerable extent, carry the silicious tests into the pores of the wood, as also will paraffin to the same or a greater extent. When so carried into and left within the pores of the wood, the silicious tests are hard, gritty and sharp and destructive to the life of any boring insect which may have penetrated the timber through its pores or otherwise; but if the second step of my process is carefully and fully applied the effect will be to prevent the entrance of any such boring insect, or even of any spores, at least to the extent that the exterior walls of the pores and ducts are covered by a film of paraffin and filled in part and hence obstruct and cover that which would otherwise supply food to such organisms or fungi. It is obvious from what has been stated that the mixture of diatomaceous earth while preferable, is not essential in both of the two successive steps, nor in either as applied to woods not liable to be attacked by borers or living insects.

As a result of the treatment the wood is increased in specific weight, especially where diatomaceous earth is used as a part of the process, and thus the strength of the wood is necessarily increased, as is also its resiliency. As a further result of the process, in respect of the effect of the second bath, if properly prepared in the first step, the woody tissue of the material is absolutely impermeable to exterior moisture. Its life as timber is, for the several reasons stated, therefore very much prolonged over any seasoned timber, or any other timber preserved by any other process or method of which I am aware.

Having thus described my invention, I claim as new and desire to secure by Letters Patent:—

1. The process of treating raw cut timber in its normal condition, to preserve it, which consists in successively subjecting it in suitable containers, first to the action of a volatile low boiling petroleum distillate and then to the action of normally solid paraffin applied at a melting temperature.

2. The process of preserving raw cut timber in its normal condition, which consists in preliminarily saturating it with a volatile low boiling distillate commercially known as benzin, in an open tank at atmospheric temperature, and then subjecting it, in a suitable container, adapted to be heated, for a period of one to four hours, to the action of normally solid paraffin of commerce melted and maintained at a temperature not in excess of 212 F. approximately.

3. The process of treating cut timber to preserve it, which consists in successively subjecting it in suitable containers, first to the action of a volatile low boiling distillate commercially known as benzin, and then to the action of a normally solid commercial paraffin, applied at a melting temperature, in one of which said agents a diatomaceous earth is carried in suspension.

4. The herein described product consisting of cut timber, the pores, ducts and cellular tissue of which contain diatomaceous earth deposited therein together with re-solidified paraffin with which said timber has been treated.

In testimony whereof, I have hereunto affixed my signature this second day of February A. D. 1910.

ROBERT ATHELSTAN MARR.

Witnesses:
JOSEPH T. LUTTRELL,
BYRD ANDERSON.